US012666102B2

(12) United States Patent
Tirimba et al.

(10) Patent No.: US 12,666,102 B2
(45) Date of Patent: Jun. 23, 2026

(54) PANEL AND UNIVERSE ESTIMATE BASED DEMOGRAPHIC DISTRIBUTION TARGET CALCULATION FOR ASSIGNMENT MODELS

(71) Applicant: The Nielsen Company (US), LLC, New York, NY (US)

(72) Inventors: Keith Tirimba, Tampa, FL (US); Richard Peters, Paw Paw, IL (US); Horalia Armas, Palentine, IL (US); Denis Voytenko, Tampa, FL (US); Stephen Scott Bell, McHenry, IL (US); Paul Chimenti, Lakewood, NY (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 19/052,995

(22) Filed: Feb. 13, 2025

(65) Prior Publication Data

US 2025/0274624 A1    Aug. 28, 2025

Related U.S. Application Data

(60) Provisional application No. 63/556,519, filed on Feb. 22, 2024.

(51) Int. Cl.
*H04N 21/262*      (2011.01)
*H04N 21/258*      (2011.01)

(52) U.S. Cl.
CPC ..... *H04N 21/262* (2013.01); *H04N 21/25808* (2013.01)

(58) Field of Classification Search
CPC ..................... H04N 21/262; H04N 21/25808
See application file for complete search history.

(56) References Cited

U.S. PATENT DOCUMENTS

| | | | |
|---|---|---|---|
| 4,258,386 A | 3/1981 | Cheung |
| 4,546,382 A | 10/1985 | Mckenna et al. |
| 4,602,279 A | 7/1986 | Freeman |
| 4,745,549 A | 5/1988 | Hashimoto |

(Continued)

OTHER PUBLICATIONS

Arbitron Inc., Respondent-Level Data: Your Key to Reaching the Hispanic Listener, retrieved from <http://arbitronratings.com/adagencies/rldvs_hispsumm.htm?inframe>, retrieved on Sep. 21, 2007, 1 page.

(Continued)

*Primary Examiner* — Yassin Alata

(57) ABSTRACT

An example method includes determining a provider distribution by television viewing area using a provider-reported number of subscribers for a television viewing area and a sum of weights of panelist households that are located within the television viewing area. The method also includes obtaining a target distribution of a characteristic for the television viewing area. In addition, the method includes determining, using iterative proportional fitting, provider-specific distributions of the characteristic for the television viewing area. And the method includes using the provider-specific distributions of the characteristic for the television viewing area as a basis for assigning values of the characteristic to households that are subscribers of the return path data provider and located in the television viewing area.

20 Claims, 7 Drawing Sheets

(56)  References Cited

U.S. PATENT DOCUMENTS

| | | | |
|---|---|---|---|
| 4,930,011 | A | 5/1990 | Kiewit |
| 5,251,324 | A | 10/1993 | Mcmullan, Jr. |
| 5,374,951 | A | 12/1994 | Welsh |
| 5,550,928 | A | 8/1996 | Lu et al. |
| 5,600,364 | A | 2/1997 | Hendricks et al. |
| 5,608,445 | A | 3/1997 | Mischler |
| 5,798,785 | A | 8/1998 | Hendricks et al. |
| 5,801,747 | A | 9/1998 | Bedard |
| 5,841,433 | A | 11/1998 | Chaney |
| 5,848,396 | A | 12/1998 | Gerace |
| 5,857,190 | A | 1/1999 | Brown |
| 5,872,588 | A | 2/1999 | Aras et al. |
| 5,948,061 | A | 9/1999 | Merriman et al. |
| 5,977,964 | A | 11/1999 | Williams et al. |
| 5,991,735 | A | 11/1999 | Gerace |
| 6,005,597 | A | 12/1999 | Barrett et al. |
| 6,049,695 | A | 4/2000 | Cottam |
| 6,067,440 | A | 5/2000 | Diefes |
| 6,088,722 | A | 7/2000 | Herz et al. |
| 6,112,186 | A | 8/2000 | Bergh et al. |
| 6,119,098 | A | 9/2000 | Guyot et al. |
| 6,298,348 | B1 | 10/2001 | Eldering |
| 6,446,261 | B1 | 9/2002 | Rosser |
| 6,463,585 | B1 | 10/2002 | Hendricks et al. |
| 6,530,082 | B1 | 3/2003 | Del Sesto et al. |
| 6,684,194 | B1 | 1/2004 | Eldering et al. |
| 6,714,917 | B1 | 3/2004 | Eldering et al. |
| 7,047,550 | B1 | 5/2006 | Yasukawa et al. |
| 7,050,990 | B1 | 5/2006 | Chu et al. |
| 7,051,352 | B1 | 5/2006 | Schaffer |
| 7,062,510 | B1 | 6/2006 | Eldering |
| 7,117,518 | B1 | 10/2006 | Takahashi et al. |
| 7,139,723 | B2 | 11/2006 | Conkwright et al. |
| 7,146,329 | B2 | 12/2006 | Conkwright et al. |
| 7,150,030 | B1 | 12/2006 | Eldering et al. |
| 7,168,084 | B1 | 1/2007 | Hendricks et al. |
| 7,197,472 | B2 | 3/2007 | Conkwright et al. |
| 7,231,652 | B2 | 6/2007 | Gutta et al. |
| 7,260,823 | B2 | 8/2007 | Schlack et al. |
| 7,376,722 | B1 | 5/2008 | Sim et al. |
| 7,383,243 | B2 | 6/2008 | Conkwright et al. |
| 7,844,985 | B2 | 11/2010 | Hendricks et al. |
| 7,937,725 | B1 | 5/2011 | Schaffer et al. |
| 7,962,935 | B2 | 6/2011 | Kurosaki et al. |
| 8,001,561 | B2 | 8/2011 | Gibbs et al. |
| 8,250,605 | B2 | 8/2012 | Opaluch |
| 8,327,395 | B2 | 12/2012 | Lee et al. |
| 8,365,213 | B1 | 1/2013 | Orlowski |
| 8,392,946 | B2 | 3/2013 | Hnyk et al. |
| 8,543,454 | B2 | 9/2013 | Fleischman et al. |
| 8,745,647 | B1 | 6/2014 | Shin et al. |
| 8,874,652 | B1 | 10/2014 | Pecjak et al. |
| 8,908,699 | B2 | 12/2014 | Karaoguz et al. |
| 9,344,509 | B1 | 5/2016 | Serboncini et al. |
| 9,420,320 | B2 | 8/2016 | Doe |
| 9,578,361 | B2 | 2/2017 | Doe |
| 9,900,655 | B2 | 2/2018 | Doe |
| 10,356,485 | B2 | 7/2019 | Sullivan et al. |
| 10,368,130 | B2 | 7/2019 | Nagaraja Rao et al. |
| 10,560,740 | B2 | 2/2020 | Doe |
| 11,089,361 | B2 | 8/2021 | Doe |
| 11,308,514 | B2 | 4/2022 | Sheppard et al. |
| 11,496,799 | B2 | 11/2022 | Doe |
| 2001/0049620 | A1 | 12/2001 | Blasko |
| 2002/0056087 | A1 | 5/2002 | Berezowski et al. |
| 2002/0095676 | A1 | 7/2002 | Knee et al. |
| 2002/0104083 | A1 | 8/2002 | Hendricks et al. |
| 2002/0174428 | A1 | 11/2002 | Agnihotri et al. |
| 2003/0018969 | A1 | 1/2003 | Humpleman et al. |
| 2003/0020744 | A1 | 1/2003 | Ellis et al. |
| 2003/0051240 | A1 | 3/2003 | Schaffer et al. |
| 2003/0093530 | A1 | 5/2003 | Syed |
| 2004/0226034 | A1 | 11/2004 | Kaczowka et al. |
| 2005/0149946 | A1 | 7/2005 | Evans |
| 2005/0149964 | A1 | 7/2005 | Thomas et al. |
| 2005/0193411 | A1 | 9/2005 | Funston |
| 2006/0020973 | A1 | 1/2006 | Hannum et al. |
| 2006/0026642 | A1 | 2/2006 | Schaffer et al. |
| 2006/0074769 | A1 | 4/2006 | Looney et al. |
| 2006/0075421 | A1 | 4/2006 | Roberts et al. |
| 2006/0174277 | A1 | 8/2006 | Sezan et al. |
| 2007/0011039 | A1 | 1/2007 | Oddo |
| 2007/0022032 | A1 | 1/2007 | Anderson et al. |
| 2007/0136753 | A1 | 6/2007 | Bovenschulte et al. |
| 2007/0138753 | A1 | 6/2007 | Huang |
| 2007/0143775 | A1 | 6/2007 | Savoor et al. |
| 2007/0204287 | A1 | 8/2007 | Conradt et al. |
| 2007/0240180 | A1 | 10/2007 | Shanks et al. |
| 2007/0250856 | A1 | 10/2007 | Leavens et al. |
| 2008/0140479 | A1 | 6/2008 | Mello et al. |
| 2008/0167943 | A1 | 7/2008 | O'neil et al. |
| 2008/0172781 | A1 | 7/2008 | Popowich et al. |
| 2008/0249834 | A1 | 10/2008 | Zigmond et al. |
| 2008/0271078 | A1 | 10/2008 | Gossweiler et al. |
| 2008/0300965 | A1 | 12/2008 | Doe |
| 2009/0030780 | A1 | 1/2009 | York et al. |
| 2009/0113480 | A1 | 4/2009 | Allard et al. |
| 2009/0150917 | A1 | 6/2009 | Huffman et al. |
| 2009/0178081 | A1 | 7/2009 | Goldenberg et al. |
| 2009/0292587 | A1 | 11/2009 | Fitzgerald |
| 2010/0037253 | A1 | 2/2010 | Sheehan et al. |
| 2010/0169927 | A1 | 7/2010 | Yamaoka et al. |
| 2010/0211439 | A1 | 8/2010 | Marci et al. |
| 2011/0004682 | A1 | 1/2011 | Honnold et al. |
| 2011/0279311 | A1 | 11/2011 | Hamano |
| 2012/0151079 | A1 | 6/2012 | Besehanic et al. |
| 2012/0158527 | A1 | 6/2012 | Cannelongo et al. |
| 2012/0159528 | A1 | 6/2012 | Toney, Jr. |
| 2012/0192214 | A1 | 7/2012 | Hunn et al. |
| 2012/0215903 | A1 | 8/2012 | Fleischman et al. |
| 2012/0254911 | A1 | 10/2012 | Doe |
| 2012/0303834 | A1 | 11/2012 | Adam et al. |
| 2014/0053225 | A1 | 2/2014 | Shoykher et al. |
| 2014/0108130 | A1 | 4/2014 | Vos et al. |
| 2017/0091786 | A1* | 3/2017 | Sheppard ......... H04N 21/44213 |
| 2017/0150217 | A1 | 5/2017 | Doe |
| 2017/0180798 | A1 | 6/2017 | Goli et al. |
| 2018/0152760 | A1 | 5/2018 | Venetucci et al. |
| 2018/0167675 | A1 | 6/2018 | Doe |
| 2020/0226465 | A1 | 7/2020 | Harrington et al. |
| 2021/0133773 | A1 | 5/2021 | Sheppard et al. |
| 2021/0158377 | A1 | 5/2021 | Sheppard et al. |
| 2022/0070530 | A1 | 3/2022 | Doe |
| 2023/0078684 | A1 | 3/2023 | Kurzynski et al. |
| 2023/0096891 | A1* | 3/2023 | Tucker ............ H04N 21/25883 |
| | | | 725/34 |
| 2023/0222525 | A1* | 7/2023 | Sheppard ......... H04N 21/44213 |
| | | | 725/9 |
| 2024/0144323 | A1* | 5/2024 | Tucker .............. G06Q 30/0204 |

OTHER PUBLICATIONS

Arbitron Inc., Smartplus 8.0: Keeps Getting Smarter So You Can Too, 2007, 13 pages.

Bell et al., "The Effect of Sampling Error on the Time Series Behavior of Consumption Data," Journal of Econometrics 55 (1993) 235-265, 31 pages.

Consoli, John, http://www.mediaweek.com, Nielsen Unveils NationalTV/Internet Fusion, internet article, Nov. 1, 2006, 2 pages.

Disogra et al., "Calibrating Non-Probability Internet Samples with Probability Samples Using Early Adopter Characteristics," dated Jan. 2011, accessed from http://www.asasrms.org/Proceedings/y2011/Files/302704_68925.pdf, 15 pages.

Gilula et al., "A Direct Approach to Data Fusion", Journal of Marketing Research, vol. 43, Feb. 2006, 22 pages.

International Searching Authority, International Search Report, for International Application No. PCT/US2008/059874, Mar. 2, 2009, 2 pages.

International Searching Authority, Written Opinion, for International Application No. PCT/US2008/059874, Mar. 2, 2009, 5 pages.

Kugel et al., "Decay Effects in Online Advertising: Quantifying the Impact of Time Since Last Exposure," Presented at the ARF 50th Annual Convention, New York City, Apr. 26-28, 2004, 19 pages.

(56) References Cited

OTHER PUBLICATIONS

Philip Morris, "Teenage Attitudes and Behavior Study", Methodology 2006, 9 pages.

Scott, Stuart, "On the Impact of Sampling Error on Modeling Seasonal Time Series," Bureau of Labor Statistics Publications, Office of Survey Methods Research, Oct. 2009, accessed from https://www.b1s.goviosmr/researchpapers/2009/pdfist090230.pdf, 15 pages.

United States Patent and Trademark Office, "Final Office Action," issued in connection with U.S. Appl. No. 13/078,574, filed May 29, 2013, 16 pages.

United States Patent and Trademark Office, "Final Office Action," mailed in connection with the U.S. Appl. No. 15/891,076, filed Mar. 6, 2019 (24 pages).

United States Patent and Trademark Office, "Non-Final Office Action," issued in connection with U.S. Appl. No. 13/078,574, filed Dec. 13, 2012, 17 pages.

United States Patent and Trademark Office, "Non-final Office Action," mailed in connection with the U.S. Appl. No. 15/891,076, filed Sep. 17, 2018, 29 pages.

United States Patent and Trademark Office, "Non-final Office Action," issued in connection with U.S. Appl. No. 12/100,953, filed Mar. 18, 2011, 15 pages.

United States Patent and Trademark Office, "Final Office Action," issued in connection with U.S. Appl. No. 17/944,013, dated Sep. 19, 2024, 27 pages.

United States Patent and Trademark Office, Non-Final Office Action, issued in connection with U.S. Appl. No. 17/944,013, dated Mar. 5, 2024, 18 pages.

Yeager et al., "Comparing the Accuracy of RDD Telephone Surveys and Internet Surveys Conducted with Probability and Non-Probability Samples," dated Aug. 2009, accessed from https://www.researchgate.net/publication/237252858, 42 pages.

* cited by examiner

302

| Prov. 1 - DMA | Prov. 1 - Region | SoW - DMA | SoW - Region |
|---|---|---|---|
| 61,340 | 798,062 | 50,647 | 549,142 |

304

| Prov. 2 - DMA | Prov. 2 - Region | SoW - DMA | SoW - Region |
|---|---|---|---|
| 240,206 | 2,231,144 | 139,646 | 1,343,178 |

306

| Prov. 3 - DMA | Prov. 3 - Region | SoW - DMA | SoW - Region |
|---|---|---|---|
| 0 | 217,188 | 0 | 282,748 |

308

| Prov. 4 - DMA | Prov. 4 - Region | SoW - DMA | SoW  -Region |
|---|---|---|---|
| 1,325,300 | 5,833,098 | 993,715 | 3,577,800 |

310

| Non-RPD SoW - DMA | Non-RPDSoW - Region |
|---|---|
| 2,058,574 | 19,882,361 |

312

| Prov. 1 - DMA | Prov. 2 - DMA | Prov. 3 - DMA | Prov. 4 - DMA | Non-RPD - DMA |
|---|---|---|---|---|
| 1.9% | 7.4% | 0.0% | 40.9% | 49.8% |

314

| Prov. 1 - Reg. | Prov. 2 - Reg. | Prov. 3 - Reg. | Prov. 4 - Reg. | Non-RPD - Reg. |
|---|---|---|---|---|
| 3.1% | 8.7% | 0.8% | 22.8% | 64.6% |

|  |  | Hispanic | Prov. 1 | Prov. 2 | Prov. 3 | Prov. 4 | Non-RPD |
|---|---|---|---|---|---|---|---|
| SoW | Yes | 74,192 | 146,811 | 14,596 | 388,884 | 2,453,983 |
| SoW | No | 474,950 | 1,196,367 | 268,152 | 3,188,916 | 17,428,378 |
| Column % | Yes | 13.51% | 10.93% | 5.16% | 10.87% | 12.34% |
| Column % | No | 86.49% | 89.07% | 94.84% | 89.13% | 87.66% |

404

| Hispanic | Prov. 1 | Prov. 2 | Prov. 3 | Prov. 4 | Non-RPD | Total |
|---|---|---|---|---|---|---|
| Yes | 0.4% | 1.0% | 0.0% | 2.5% | 8.0% | 11.9% |
| No | 2.7% | 7.8% | 0.8% | 20.3% | 56.6% | 88.1% |
| Total | 3.1% | 8.7% | 0.8% | 22.8% | 64.6% | 100.0% |

406

| Hispanic | Prov. 1 | Prov. 2 | Prov. 3 | Prov. 4 | Non-RPD |
|---|---|---|---|---|---|
| Yes | 1.084 | 0.966 | 0 | 0.921 | 1.041 |
| No | 0.989 | 1.018 | 1.135 | 1.011 | 0.995 |

502

| Hispanic | Prov. 1 | Prov 2. | Prov. 3 | Prov. 4 | Non-RPD | Total |
|----------|---------|---------|---------|---------|---------|-------|
| Yes | | | | | | 10.0% |
| No | | | | | | 90.0% |
| Total | 1.9% | 7.4% | 0.0% | 40.9% | 49.8% | 100% |

504

| Hispanic | Prov. 1 | Prov 2. | Prov. 3 | Prov. 4 | Non-RPD | Total |
|----------|---------|---------|---------|---------|---------|-------|
| Yes | 0.21% | 0.71% | 0.00% | 3.77% | 5.18% | 9.87% |
| No | 1.69% | 6.78% | 0.00% | 37.20% | 44.57% | 90.24% |
| Total | 1.90% | 7.49% | 0.00% | 40.97% | 49.76% | 100.11% |

506

| Hispanic | Prov. 1 | Prov 2. | Prov. 3 | Prov. 4 | Non-RPD | Total |
|----------|---------|---------|---------|---------|---------|-------|
| Yes | .21% | .71% | 0.00% | 3.76% | 5.19% | 9.86% |
| No | 1.69% | 6.69% | 0.00% | 37.14% | 44.61% | 90.14% |
| Total | 1.9% | 7.40% | 0.0% | 40.9% | 49.8% | 100% |

508

| Hispanic | Prov. 1 | Prov 2. | Prov. 3 | Prov. 4 | Non-RPD | Total |
|----------|---------|---------|---------|---------|---------|-------|
| Yes | .21% | .72% | 0.00% | 3.82% | 5.26% | 10% |
| No | 1.69% | 6.68% | 0.00% | 37.08% | 44.54% | 90% |
| Total | 1.9% | 7.40% | 0.0% | 40.9% | 49.8% | 100% |

FIG. 5

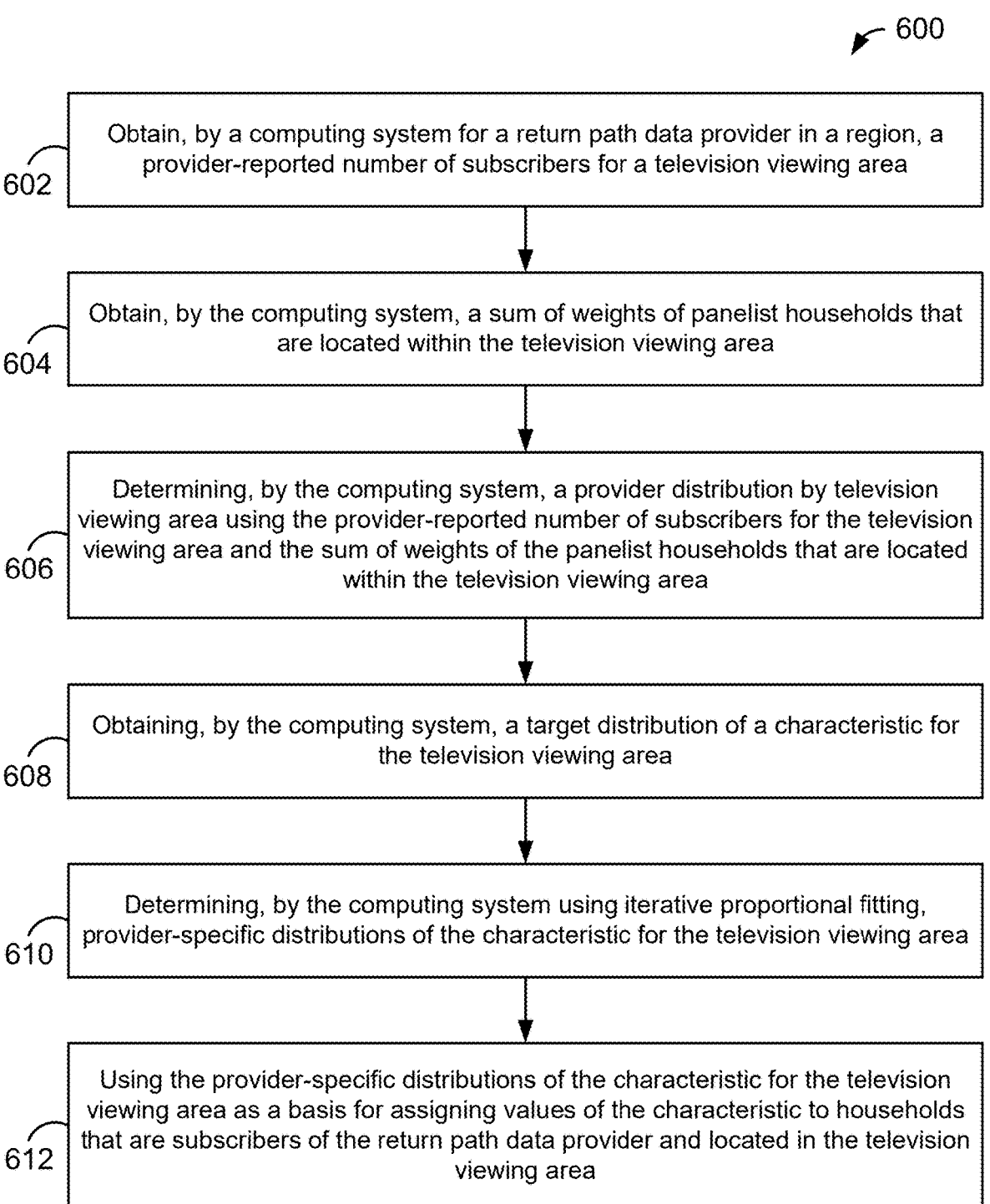

600

602   Obtain, by a computing system for a return path data provider in a region, a provider-reported number of subscribers for a television viewing area 604   Obtain, by the computing system, a sum of weights of panelist households that are located within the television viewing area 606   Determining, by the computing system, a provider distribution by television viewing area using the provider-reported number of subscribers for the television viewing area and the sum of weights of the panelist households that are located within the television viewing area 608   Obtaining, by the computing system, a target distribution of a characteristic for the television viewing area 610   Determining, by the computing system using iterative proportional fitting, provider-specific distributions of the characteristic for the television viewing area 612   Using the provider-specific distributions of the characteristic for the television viewing area as a basis for assigning values of the characteristic to households that are subscribers of the return path data provider and located in the television viewing area

FIG. 6

PANEL AND UNIVERSE ESTIMATE BASED DEMOGRAPHIC DISTRIBUTION TARGET CALCULATION FOR ASSIGNMENT MODELS

CROSS-REFERENCE TO RELATED APPLICATIONS

This disclosure claims the benefit of U.S. Provisional Application No. 63/556,519, filed on Feb. 22, 2024, the entire contents of which are hereby incorporated by reference.

BACKGROUND

Audience measurement entities (AMEs), such as The Nielsen Company (US), LLC, may extrapolate ratings metrics and/or other audience measurement data for a total television viewing audience from a sample of panel homes. The panel homes may be chosen to be representative of an audience universe as a whole. Furthermore, to help supplement panel data, an AME may license television tuning information from third parties. The television tuning information may be derived from set-top boxes and/or other devices that deliver television content to households.

SUMMARY

Existing household demographic assignment models seek to assign one or more demographic categories to return path data households. Some household demographic assignment models leverage mixed integer programming. With this approach, the most likely assignment of individuals to each household is solved for programmatically, subject to a number of logical constraints, Those logical constraints include provider-specific demographic distribution targets for individual television viewing areas (e.g., designated market areas). The systems and methods disclosed herein provide a methodology for solving for demographic distribution targets in a manner that accounts for demographic skews of return path data providers.

In one aspect, a computing system is described. The computing system includes a processor and a memory, and is configured to perform a set of acts. The set of acts includes obtaining, for a return path data provider in a region, a provider-reported number of subscribers for a television viewing area within the region. The set of acts also includes obtaining a sum of weights of panelist households that are located within the television viewing area. The set of acts further includes determining a provider distribution by television viewing area using the provider-reported number of subscribers for the television viewing area and the sum of weights of the panelist households that are located within the television viewing area. In addition, the set of acts includes obtaining a target distribution of a characteristic for the television viewing area. Further, the set of acts includes determining, using iterative proportional fitting, provider-specific distributions of the characteristic for the television viewing area. The provider distribution by television viewing area and the target distribution of the characteristic for the television viewing area are used as target values for the iterative proportional fitting. And the set of acts includes using the provider-specific distributions of the characteristic for the television viewing area as a basis for assigning values of the characteristic to households that are subscribers of the return path data provider and located in the television viewing area.

In another aspect, a method is described. The method includes obtaining, by a computing system for a return path data provider in a region, a provider-reported number of subscribers for a television viewing area within the region. The method also includes obtaining, by the computing system, a sum of weights of panelist households that are located within the television viewing area. The method also includes determining, by the computing system, a provider distribution by television viewing area using the provider-reported number of subscribers for the television viewing area and the sum of weights of the panelist households that are located within the television viewing area. In addition, the method includes obtaining, by the computing system, a target distribution of a characteristic for the television viewing area. Further, the method includes determining, by the computing system using iterative proportional fitting, provider-specific distributions of the characteristic for the television viewing area. The provider distribution by television viewing area and the target distribution of the characteristic for the television viewing area are used as target values for the iterative proportional fitting. And the method includes using the provider-specific distribution of the characteristic for the television viewing are as a basis for assigning values of the characteristic to households that are subscribers of the return path data provider and located in the television viewing area.

In another aspect, a non-transitory computer-readable storage medium is described. The non-transitory computer-readable storage medium has stored thereon instruction, that upon execution by a computing system, cause the computing system to perform a set of acts. The set of acts includes obtaining, for a return path data provider in a region, a provider-reported number of subscribers for a television viewing area within the region. The set of acts also includes obtaining a sum of weights of panelist households that are located within the television viewing area. The set of acts further includes determining a provider distribution by television viewing area using the provider-reported number of subscribers for the television viewing area and the sum of weights of the panelist households that are located within the television viewing area. In addition, the set of acts includes obtaining a target distribution of a characteristic for the television viewing area. Further, the set of acts includes determining, using iterative proportional fitting, provider-specific distributions of the characteristic for the television viewing area. The provider distribution by television viewing area and the target distribution of the characteristic for the television viewing area are used as target values for the iterative proportional fitting. And the set of acts includes using the provider-specific distributions of the characteristic for the television viewing area as a basis for assigning values of the characteristic to households that are subscribers of the return path data provider and located in the television viewing area.

BRIEF DESCRIPTION OF THE DRAWINGS

FIG. 3 illustrates example data for a region.

FIG. 5 is a conceptual illustration of iterative proportional fitting.

FIG. 6 is a flow chart of an example method.

DETAILED DESCRIPTION

I. Overview

Figure 1:
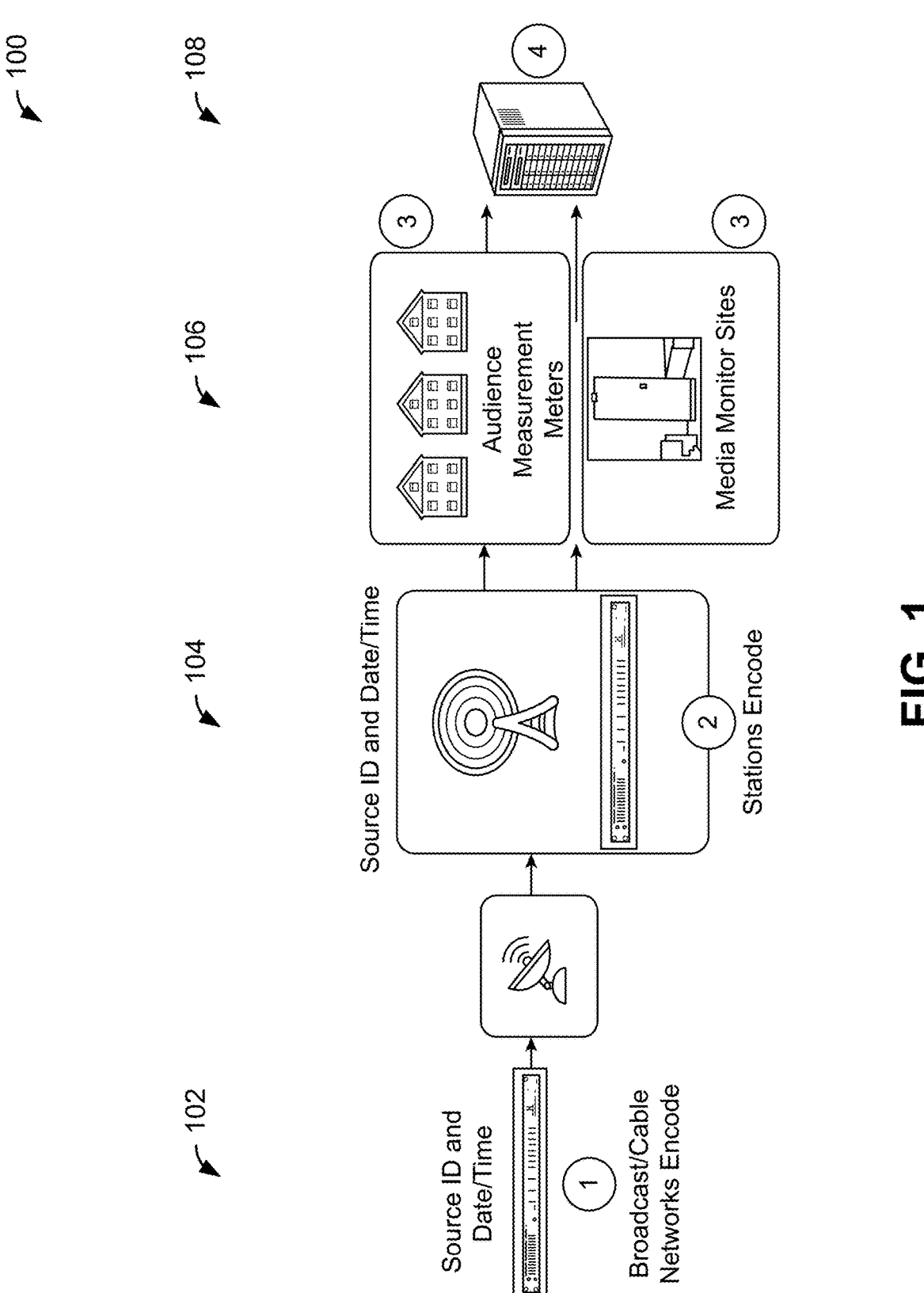
FIG. 1 is a conceptual illustration of an example measurement process.

Existing household demographic assignment models seek to assign one or more demographic categories to return path data (RPD) households using probability data. By way of example, neural-network based demographic estimation systems use panel data collected from monitored panelist households as a training set for training a neural network. The trained neural network is then able to predict from RPD, probabilities of different household demographic characteristics being associated with respective ones of the RPD households reporting the RPD.

Demographic assignment models use the probabilities generated by a neural-network based demographic estimation system, or other type of estimation system to binarize the probabilities output by the demographic estimation system and definitively assign demographic occupancy of each RPD household. Binarizing a probability can be viewed as converting the probability to either zero percent or one hundred percent.

A naive method for binarizing the demographic predictions might be to simply round the probabilities to a nearest integer value of zero or one. But this straightforward approach would introduce a number of significant sources of biases if it were used to assign all unknown homes. For instance, simple rounding ignores prior information about the geolocation of each household, as different geographic regions have different demographic compositions. Moreover, rounding merely considers the assignment of each household individually, rather than in a manner that seeks to match the global distribution of demographic attributes expected in a given geographic region.

To address these issues, some household demographic assignment models leverage mixed integer programming. With this approach, the most likely assignment of individuals to each household is solved for programmatically, subject to a number of logical constraints. Those logical constraints include demographic distribution targets for individual television viewing areas (e.g., designated market areas). One example of a demographic distribution target is that 10% of households in a television viewing area are Hispanic, and 90% of households in a television viewing area are non-Hispanic.

When assigning individuals to households at the provider-level (e.g., assigning individuals to households for all households that are subscribers of a given RPD provider), it is useful to have accurate distribution targets that are specific to the provider. One approach for generating a distribution target for a specific RPD provider is to assume that the distribution of a demographic characteristic within households that are subscribers of a specific RPD provider is the same as the overall distribution of the demographic characteristic for the television viewing area. For instance, continuing with the example above, if there are 10,000 households that are subscribers of an RPD provider, one could assume that 1,000 of the households are Hispanic and the other 9,000 households are non-Hispanic.

Unfortunately, however, this assumption ignores the interaction between the demographic characteristic (Hispanic vs. non-Hispanic) and subscriptions to the RPD provider within the television viewing area. Put another way, the assumption ignores the fact that there are demographic skews within the demographic makeup of households of respective RPD providers.

The systems and methods disclosed herein provide a methodology for solving for demographic distribution targets in a manner that accounts for demographic skews of return path data providers. As described herein, the methodology assumes a similar regional adjustment function for all television viewing areas in a region, and leverages the higher panel sample available at the regional levels to improve target accuracy and stability. Moreover, the methodology leverages iterative proportional fitting to estimate provider-specific distribution targets for individual television viewing areas.

II. System Architecture a. Example Measurement Process

FIG. 1 is a conceptual illustration of an example measurement process 100. Measurement process 100 depicts operations that can be carried out within an audience measurement system. More specifically, FIG. 1 shows measurement process 100 as including a first stage 102, a second stage 104, a third stage 106, and a fourth stage 108.

As part of first stage 102, a broadcast/cable network encodes watermarks into media content using an encoder. A watermark is any identification information that may be inserted or embedded in the audio or video of media (e.g., a program or an advertisement) for the purpose of identifying the media. In other words, the watermark can include an audio watermark or a video watermark. In some examples, the watermark is imperceptible to humans. By way of example, during first stage 102, a television network can encode an audio watermark into media. The audio watermark can include a source identifier (e.g., a station identifier) as well as a date and/or time.

After the watermark is inserted, the broadcast/cable network distributes the watermarked media to a television station, such as a local television station for a geographic region. At second stage 104, the television station encodes watermarks into the media. For instance, the television station can encode watermarks into local media that is specific to the geographic region, such as advertisements or local programming. The television station then distributes the watermarked media to various households in the geographic region.

During third stage 106, an audience measurement meter in a panelist household monitors media content that is presented within the panelist household. For instance, the audience measurement meter detects the watermarks and decodes the watermarks so as to reveal the identification information (i.e., the source identifier and date and/or time).

The audience measurement meter then reports the identification information to a remote computing system of an AME. For instance, the audience measurement meter may be connected to a local network of the panelist household, such that the audience measurement meter can transmit the identification information to the remote computing system via the local network and the internet. Or the audience measurement meter can transmit the identification to the remote computing system using a cellular modem of the audience measurement meter.

In some examples, the AME provides the audience measurement meter to the panelist household such that the audience measurement meter may be installed in a media presentation environment of the panelist household. The audience measurement meter can be installed by a panelist by simply powering the audience measurement meter and placing the audience measurement meter near a presentation device (e.g., a television). Alternatively, a field representation of the AME may visit the panelist household to install and configure the audience measurement meter.

In some examples, to monitor media presented by the presentation device, the audience measurement meter senses audio (e.g., acoustic signals or ambient audio) output by the presentation device. For example, the audience measurement meter processes the signals obtained from the media presentation device to detect media and/or source identifying signals (e.g., audio watermarks) embedded in the media presented by the presentation device. In some examples, the audience measurement meter includes a microphone array to sense ambient audio. Additionally or alternatively, the audience measurement meter may directly receive audio signals from the presentation device via a wired or wireless connection with the presentation device.

In some examples, the audience measurement meter can sense video output by the presentation device, and utilize video watermarking to obtain identification information for the media presented by the presentation device.

Further, instead of or in addition to detecting watermarks, the audience measurement meter can utilize fingerprint-based media identification techniques. Unlike media monitoring techniques based on watermarks included with and/or embedded in the monitored media, fingerprint-based media monitoring techniques generally use one or more inherent characteristics of the monitored media during a monitoring time interval to generate a substantially unique proxy for the media. Such a proxy is referred to as fingerprint, and can take any form representative of any aspect of the media signal (e.g., the audio and/or video signals forming the media presentation being monitored).

Fingerprint-based media monitoring generally involves determining signatures representative of a media signal output by a monitored presentation device and comparing the monitored signatures to one or more reference signatures corresponding to known media sources. To facilitate this comparison, the audience measurement meter generates signatures, and transmits the signatures to the remote computing system of the AME. In addition, a plurality of media monitor sites receive media content distributed within a geographic region, generate reference signatures for the media content, and associate identification information with the reference signatures. The identification information can include any combination of a date/time, channel, or media identifier. Alternatively, the audience measurement meter can compare a generated signature against a reference database of signatures stored by the audience measurement meter. Various comparison criteria, such as a cross-correlation value or a Hamming distance, can be evaluated to determine whether a generated signature matches a particular reference signature. After matching the generated signature with a signature of the reference database, the audience measurement meter can report metadata associated with the matching signature (e.g., a media title, a presentation time, and/or a broadcast channel) to the remote computing system of the AME.

In some examples, to generate exposure data for the media, identification information for media to which the panelists in a panelist household are exposed is correlated with people data (e.g., presence information) collected by the audience measurement meter. By way of example, the audience measurement meter collects inputs (e.g., audience identification data) representative of the identities of the panelists. The audience measurement meter can collect audience identification data by periodically or a-periodically prompting panelists in the media presentation environment to identify themselves as present in the audience. Panelists can indicate their presence by pressing an appropriate key on an input device, such as a remote control, a touchscreen, or an application running on a mobile device. Alternatively, the audience measurement meter can collect audience identification data by capturing images of the media presentation environment with a camera and analyzing the images via face recognition to identify which panelist(s) are present in the media presentation environment. Likewise, the audience measurement meter can collect audience identification data by detecting the presence of a portable device (e.g., a wearable bracelet, a watch, a smartphone) that is associated with a panelist in the media presentation environment.

During fourth stage 108, the remote computing system processes and stores data received from the audience measurement meters and optionally the media monitor sites. For example, the remote computing system combines audience identification data and identification information from multiple panelist households to generate aggregated media monitoring information. In some instances, the remote computing system generates reports for advertisers, program producers, and/or other interested parties based on the compiled statistical data. Such reports can include extrapolations about the size and demographic composition of audiences of content, channels, and/or advertisements based on the demographics and behavior of the monitored panelists. The remote computing system can leverage demographic data collected from panelists during registration of the panelists with the AME.

In examples in which the remote computing system receives reference signatures, the remote computing system can compare signatures received from panelist households with the reference signatures. Various comparison criteria, such as a cross-correlation value or a Hamming distance, can be evaluated to determine whether a monitored signature matches a particular reference signature. When a match between the monitored signature and one of the reference signatures is found, the monitored media can be identified as corresponding to the particular reference media represented by the reference signature that matched the monitored signature. Because attributes, such as an identifier of the media, a presentation time, a broadcast channel, etc., are collected for the reference signature, these attributes may then be associated with the monitored media whose monitored signature matched the reference signature.

Data collected by an AME from a panelist household can be referred to as "panel data". In some cases, to calculate more accurate audience measurement metrics, an AME supplements panel data with a data source having a much larger sample size relative to the panel data. This data source can include RPD.

RPD can include any data receivable at a media service provider, such as a cable or satellite television service provider e.g., multichannel video programming distributor (MVPD) or a streaming media service provider, via a return path to the media service provider from a media consumer site, network, or cloud (e.g., a remote digital video recorder (DVR) server). As such, RPD typically includes at least a portion of set-top box (STB) data collected by STBs. STB data may include, for example, tuning events and/or commands received by the STB (e.g., power on, power off, change channel, change input source, start presenting media, pause the presentation of media, record a presentation of media, volume up/down, etc.). Additionally or alternatively, STB data can include commands sent to a content provider by the STB (e.g., switch input sources, record a media presentation, delete a recorded media presentation, the time/date a media presentation was started, the time a media presentation was completed, etc.), heartbeat signals, or the like. Further, STB data can include a household identification (e.g. a household ID) and/or a STB identification (e.g. a STB ID). RPD can also include data from any other consumer device with network access capabilities (e.g., via a cellular network, the internet, other public or private networks, etc.). For example, RPD can include any or all of linear real-time data from an STB, guide user data from a guide server, click stream data, key stream data (e.g., any click on the remote—volume, mute, etc.), interactive activity (such as Video On Demand), and any other data (e.g., data from middleware).

RPD can additionally or alternatively include automatic content recognition (ACR) data. ACR data includes viewership data that is collected by a media device using ACR techniques (e.g., watermarking, fingerprinting, etc.). An example of such a device is a smart television (also referred to as a "Smart TV") that is configured to connect to a network, such as the Internet, and execute applications. To collect ACR data, a Smart TV can use audio (and/or video) watermarking and/or fingerprinting techniques to process media received at the Smart TV and identify that media using a reference library to which the Smart TV has access. In some cases, the ACR data can identify what media was presented by the Smart TV and when. For instance, ACR data can indicate the channel that a Smart TV was tuned to and/or the name of a television program or advertisement.

An AME can enter into an agreement with various data providers to access and use RPD. For example, connected TV manufacturers and MVPDs can provide the AME with RPD.

b. Example Computing System

Figure 2:
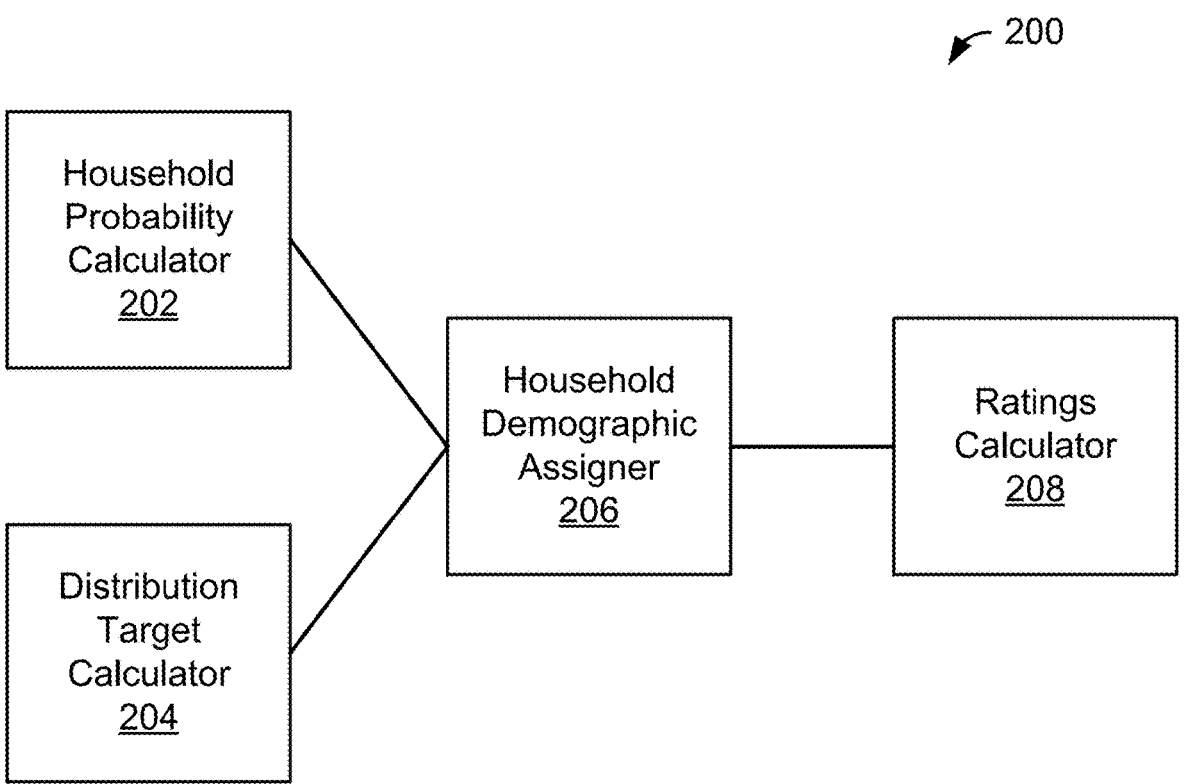
FIG. 2 is a simplified block diagram of an example audience measurement computing system in which various described operations can be implemented.

FIG. 2 is a simplified block diagram of an example audience measurement computing system 200 in which various described operations can be implemented. As shown in FIG. 2, audience measurement computing system 200 includes a household probability calculator 202, a distribution target calculator 204, a household demographic assigner 206, and a ratings calculator 208.

Household probability calculator 202 is configured to obtain RPD from households and predict estimated probabilities of different household demographic characteristics being associated with respective households. By way of example, household probability calculator 202 can extract features from the RPD and provide the features to a trained neural network. The trained neural network can then output probabilities for the demographic characteristics. The neural network can be trained using panelist tuning data collected from audience measurement meters monitoring media exposure in panel homes. An example neural network is described in U.S. Patent Application Pub. No. 2020/0226465 filed Dec. 6, 2019 and titled "Neural network processing of return path data to estimate household member and visitor demographics," which is hereby incorporated by reference.

Distribution target calculator 204 is configured to determine provider-specific distributions of one or more demographic characteristics for a television viewing area. By way of example, distribution target calculator 204 is configured to: obtain, for an RPD provider in a region, a provider-reported number of subscribers for a television viewing area with the region; obtain a sum of weights of panelist households that are located within the television viewing area; determine a provider distribution by television viewing area using the provider-reported number of subscribers for the television viewing area and the sum of weights of the panelist households that are located within the television viewing area; obtain a target distribution of a characteristic for the television viewing area; and determine, using iterative proportional fitting, provider-specific distributions of the characteristic for the television viewing area. The distribution target calculator 204 can use the provider distribution by television viewing area and the target distribution of the characteristic for the television viewing area as target values for the iterative proportional fitting.

Household demographic assigner 206 is configured to use the estimated demographic classification probabilities output by the household probability calculator 202 and the provider-specific distributions output by the distribution target calculator 204 to assign values of a demographic characteristic(s) to one or more of the RPD households. For instance, the household demographic assigner 206 can assign demographic characteristics to households using mixed integer programming. As one example, the household demographic assigner 206 can solve an objective function to determine Boolean values of a matrix, with the Boolean values representing demographic characteristics assigned to respective RPD households. The household demographic assigner 206 can solve the objective function using a cost matrix that represents the cost of assigning different demographic characteristics to the RPD households subject to a number of constraints, such as the provider-specific distributions. An example household demographic assigner is described in the above-referenced U.S. Patent Application Pub. No. 2020/0226465.

Ratings calculator 208 is configured to determine ratings data and/or other audience metrics by using the household demographic assignments determined by the household demographic assigner 206. In some instances, rating calculator 208 combines the tuning information and corresponding demographic assignments with panelist data, which already has associated demographic data, to generate the ratings data and/or other audience metrics. One example of an audience metric is a number of households that are located in a television viewing area, have at least one demographic characteristic (e.g., have a Hispanic member), and consumed a particular television program. The ratings calculator 208 can provide ratings data and/or other audience metrics to another computing system. In some instances, the receiving computing system then uses the ratings data and/or other audience metrics to display an audience metric on a dashboard.

III. Example Operations

The audience measurement computing system 200 and/or components thereof can be configured to perform and/or can perform one or more operations. Examples of these operations and related features will now be described with reference to FIGS. 3-6.

a. Determining Provider Distributions

As described with reference to FIG. 3, each RPD provider in a television viewing area reports subscriber counts to the AMB. For a given RPD provider, the subscriber counts include a number of households subscribed to the RPD provider in the television viewing area as well as a number of households subscribed to the RPD provider in a larger region encompassing the television viewing area. For this example, the television viewing area is a DMA, and the region is a region of a country.

First subscriber data 302 for a first provider indicates that, per data reported by the first provider, 61,340 households in the DMA are subscribers of the first provider, and 798,062 households in the region are subscribers of the first provider. Second subscriber data 304 for a second provider indicates that 240,206 households in the DMA are subscribers of the second provider, and 2,231,144 households in the region are subscribers of the third provider. Third subscriber data 306 indicates that the third provider does not have any subscribers in the DMA, but 217,188 households in the region are subscribers of the third provider. Fourth subscriber data 308 indicates that 1,325,300 households in the DMA are subscribers of a fourth provider, and 5,833,098 households in the regions are subscribers of the fourth provider.

The AME operates a panel in the DMA and in the region. For each panelist household in the region, the AME has corresponding metadata indicating the respective RPD provider(s) to which each household subscribes. Such metadata can be obtained based on registration of the panelist households with the AME. For instance, the AME can request that panelist households provided various information when registering with the AME. Additionally or alternatively, the AME can gather information for panelist households from an identity graph or an identity partner.

In addition, panelist households in the region have respective weights that are derived by the AME. The AME assigns weights to the panelist households to ensure that the data collected from the panel accurately represents the target population. For instance, the weighting process can give more weight, and therefore influence in ratings and audience metrics, to households having demographic compositions that are underrepresented in the panel.

A computing system of the AME can sum the weights of panelist households that are known subscribers of a first provider and located in the DMA to determine a sum of weights (SoW) for the first provider in the DMA. As shown in first subscriber data 302, the SoW for the DMA for the first provider is 50,647. Similarly, the computing system of the AME can sum the weights of households that are known subscribers of the first provider and located in the region to determine a SoW for the first provider in the region. The computing system of the AME can repeat this process for each of the other three providers as well. Similarly, the computing system of the AME can sum the weights of panelist households that are not subscribers to any RPD for the DMA and the region, to obtain non-RPD data 310.

The computing system can use the subscriber counts from the RPD providers to adjust the SoW of households that are not subscribers to any of the RPD providers so that the total sum of weights, at both the DMA and region levels, are consistent with the counts provided by the RPD providers. More specifically, at the DMA level, the computing system sums the household counts for each of the four providers, yielding a sum of subscriber households. With reference to FIG. 3, the sum of subscriber households for the DMA is 61,340+240,206+0+1,325,300=1,626,486. Further, the sum of DMA SoWs is 50,647+139,656+0+993,715+2,058, 574=3,242,582. Assuming the subscriber counts provided by the RPD providers are accurate, the computing system calculates an adjusted SoW for the non-RPD households for the DMA of 1,615,736 (3,242,582−1,626,486=1,615,736).

The computing system can use the subscriber counts and the sum of DMA SoWs to determine DMA provider distribution data 312. For instance, for the first provider, 61,340 subscribers divided by the sum of DMA SoWs of 3,242, 582=1.9%. And for non-RPD households, 1,615,736 divided by 3,242,582=49.8%.

The computing system can determine region provider distribution data 314 in a similar manner. For instance, summing the five categorial SoWs yields a total SoW for the region of 25,635,229. Summing the four provider counts for the region yields 9,079,492 subscribing households. Removing the RPD home subscriptions, the remaining value of 16,555,737 is used as the adjusted non-RPD SoW for the region. For the first provider, 798,062 divided by 25,635, 229=3.1%. And for non-RPD households, 16,555,737 divided by 25,635,229=64.6%.

b. Determining Regional Adjustments

Figure 4:
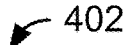
FIG. 4 illustrates additional example data for the region of FIG. 3.

In line with the discussion above, in some examples, the distribution target calculator 204 leverages the higher panel sample available at the regional levels to improve target accuracy and stability. One way of taking advantage of the higher panel sample available at the regional levels is to use the higher panel sample to determine a similar regional adjustment function for all DMAs in a region. With reference to FIG. 4, example operations for determining regional adjustments to demographic characteristics in a DMA are described.

As noted above, for each panelist household in the region, the AME has corresponding metadata indicating the respective RPD provider(s) to which each household subscribes. In addition, panelist households in the region have respective weights that are derived by the AME. The AME also has household metadata indicating the demographic composition of the household. The computing system of the AME can analyze the metadata and weights to determine regional demographic distributions.

As shown in FIG. 4, the regional demographic distribution data 402 indicates that 13.51% of households that are subscribers to the first provider meet a given demographic criteria (e.g., are Hispanic), and 86.49% of the households of the first provider do not meet the given demographic criteria. The computing system can determine the percentages for each provider by summing the weights of households that meet the criteria and the weights of households that do not meet the criteria. For instance, for the first provider, the sum of weights of households of the first provider that meet the criteria is 74,192, and the sum of weights of households of the first provider that do not meet the criteria is 474,950.

The computing system can use the region provider distribution data 314 and the regional demographic distribution data 402 to convert the regional demographic distribution data 402 into proportions of the total region. For instance, the region proportion data 404 indicates that an estimated 0.4% of the households in the region are Hispanic and subscribers of the first provider, and an estimated 2.7% of the households in the region are non-Hispanic, subscribers of the first provider. The computing system determines the proportion of the region that are Hispanic and subscribers of the first provider by multiplying 3.1% (per the region provider distribution data 314) by 13.51% (per the regional demographic distribution data 402). The computing system determines other parts of the region proportion data 404 using the appropriate percentages from the region provider distribution data 314 and the region proportion data 404.

Further, the computing system calculates a regional adjustment coefficient, F, for each combination of demographic category and provider, where $F=a/(b \times c)$, with a being the households with the characteristic and an RPD provider subscription, b being households with the characteristic, and c being homes with the RPD provider subscription. The regional adjustment coefficient represents the relative increase/decrease in regional cell penetration relative to what would be expected if the two marginals were independent. Hence, the computing system can use F to account for demographic skews of each RPD provider.

By way of example, computing system determines regional adjustment coefficients 406 using the region proportion data 404. For instance, in accordance with the proportions of FIG. 4, the regional coefficient for Hispanic households of the first provider is 1.08: a=Prov. 1 & Hispanic=0.4%, b=Hispanic=11.9%, c=subscribers of the first provider=3.1%, F=1.08.

c. Establishing Target Distributions

The AME computing system also obtains distributions for various demographic characteristics at the DMA level. The estimated distribution(s) provides insight into the prevalence or distribution of the demographic characteristic within the DMA. For instance, for the DMA, the AME can obtain a universe estimate of how many households within the DMA are Hispanic and how many households within the DMA are non-Hispanic. The AME computing system can obtain the estimated distribution from a third-party that gathers census data for various DMAs.

For the example described with references to FIGS. 3 and 4, the estimated percentage of Hispanic households in the DMA is 10% and the estimated percentage of non-Hispanic households in the DMA is 90%. The AME computing system can use the estimated distribution as a target distribution for the total distribution across all RPD providers and non-RPD households of the DMA. In addition, the AME computing system can use the region provider distribution data 314 as a target distribution for the households subscribed to the RPD providers and the non-RPD households.

d. Iterative Proportional Fitting

In line with the discussion above, in some examples, the AME computing system leverages iterative proportional fitting to estimate provider-specific distribution targets for the DMA. The provider-specific distribution targets indicate, for each provider, the percentage of households that meet and do not meet a specific demographic characteristic.

Continuing with the example described with reference to FIGS. 3 and 4, the AME computing system leverages iterative proportional fitting to estimate, for each RPD provider and the non-RPD households, the percentage of households that are Hispanic and the percentage of households that are non-Hispanic. As noted above, the AME computing system previously determined target distributions for the total distribution of the demographic characteristic across all providers and the non-RPD households, and the target distribution for households subscribed to the respective RPD providers. These target distributions 502 are shown together in FIG. 5. Note that both the sum of the last column and the sum of the last row sum to 100%.

The computing system uses the target distributions and the regional adjustment coefficients to determine initial seed values 504 for the provider-specific distribution targets for the DMA. By way of example, the initial seed value for Hispanic households of the first provider can be determined by multiplying 10% (the target Hispanic distribution for the DMA) by 1.9% (the target distribution of the DMA for the first provider) by 1.084 (the corresponding regional adjustment coefficient from FIG. 4). Similar seed values are determined for the remaining cells. Note that the initial seed values do not sum to the target distributions 502.

The AME computing system uses iterative proportional fitting to determine provider-specific distributions that meet the target distributions. Iterative proportional fitting (IPF), also known as raking, is a statistical method used to adjust or reconcile data in multi-dimensional tables. The basic idea behind IPF is to adjust the values in the multi-dimensional table to satisfy specified constraints while preserving the marginal totals of the original data. IPF operates through an iterative process where the values in the table are adjusted incrementally until the specified constraints are met. In each iterative, the adjustments are made proportionally to the discrepancies between the observed values and the desired values according to the constraints. The iterative process can proceed until the values in the table converge to a solution that satisfies the constraints within an acceptable margin of error.

Here, the AME computing system uses IPF to adjust the initial seed values 504 such that the sums of the rows and the sums of the columns satisfy the target distributions 502. By way of example, as part of an initial iteration, the AME computing system can calculate a total provider difference for each provider and the non-RPD households by subtracting the sum of the initial seed values for a provider from the target provider total. For instance, for the second provider, the sum of the initial seed values is 7.49%, but the target provider total is 7.4%, yielding a difference of −0.09%. The AME computing system then converts the provider-wise percentages to percentages out of 100%. For instance, for the second provider, 71% divided by 7.49% equals 0.095 for Hispanic; and 6.78% divided by 7.49% equals 0.905 for non-Hispanic.

The AME computing system then multiplies the differences from the first step by the provider-wise percentages from the second step to determine provider adjustment percentages. For the second provider, the adjustment percentage is 0.09%. Multiplying −0.09% by 0.095 (Hispanic) equals −0.0000855, and multiplying −0.09% by 0.905 (non-Hispanic) equals −0.000815. Then AME computing system then applies the provider adjustment percentages to the initial seed values, yielding first adjusted values 506. Note that the sums of the rows of the first adjusted values 506 do not sum to the target distribution of 10% Hispanic and 90% non-Hispanic.

The first adjusted values 506 were determined by using column-wise summations and adjustments. As part of the first iteration, the AME computing system then repeats a similar process using row-wise summations. The results of the column-wise summations and adjustments producing second adjusted values 508. Note that the rows of the second adjusted values 508 now sum to the target distribution of 10% and 90% within an acceptable margin of error. If the sums of the rows or the sums of the columns were not close enough to the target distributions 502, the AME computing system could carry out a subsequent iteration.

Because the second adjusted values 508 were derived using IPF and seeded using the regional adjustment coefficients, the second adjusted values 508 account for the demographic makeup of households of respective RPD providers. In some examples, the computing system can provide the second adjusted values 508 to a household demographic assigner, such as the household demographic assigner 206, for use as constraints for household demographic assignment. From the foregoing, one of ordinary skill in the art will appreciate that using the second adjusted values 508 for household demographic assignment provides more accurate demographic assignments, and in turn, more accurate ratings and audience metrics as opposed to a process that generates ratings without accounting for demographic skews within RPD. Hence, the operations described herein reflect an improvement to RPD-based audience measurement, an inherently technical endeavor.

e. Example Method

FIG. 6 is a flow chart of an example method 600. Method 600 can be carried out by a computing system, such as the distribution target calculator 204. At block 602, method 600 includes obtaining, for a return path data provider in a region, a provider-reported number of subscribers for a television viewing area. At block 604, method 600 includes obtaining a sum of weights of panelist households that are located within the television viewing area. At block 606, method 600 includes determining a provider distribution by television viewing area using the provider-reported number of subscribers for the television viewing area and the sum of weights of the panelist households that are located within the television viewing area. At block 608, method 600 includes obtaining a target distribution of a characteristic for the television viewing area. At block 610, method 600 includes determining, using iterative proportional fitting, provider-specific distributions of the characteristic for the television viewing area. And at block 612, method 600 includes using the provider-specific distributions of the characteristic for the television viewing area as a basis for assigning values of the characteristic to households that are subscribers of the return path data provider and located in the television viewing area.

IV. Example Computing Device

Any one or more of the above-described components, such as household probability calculator 202, distribution target calculator 204, household demographic assigner 206, and/or ratings calculator 208 can take the form of a computing device, or a computing system that includes one or more computing devices.

Figure 7:
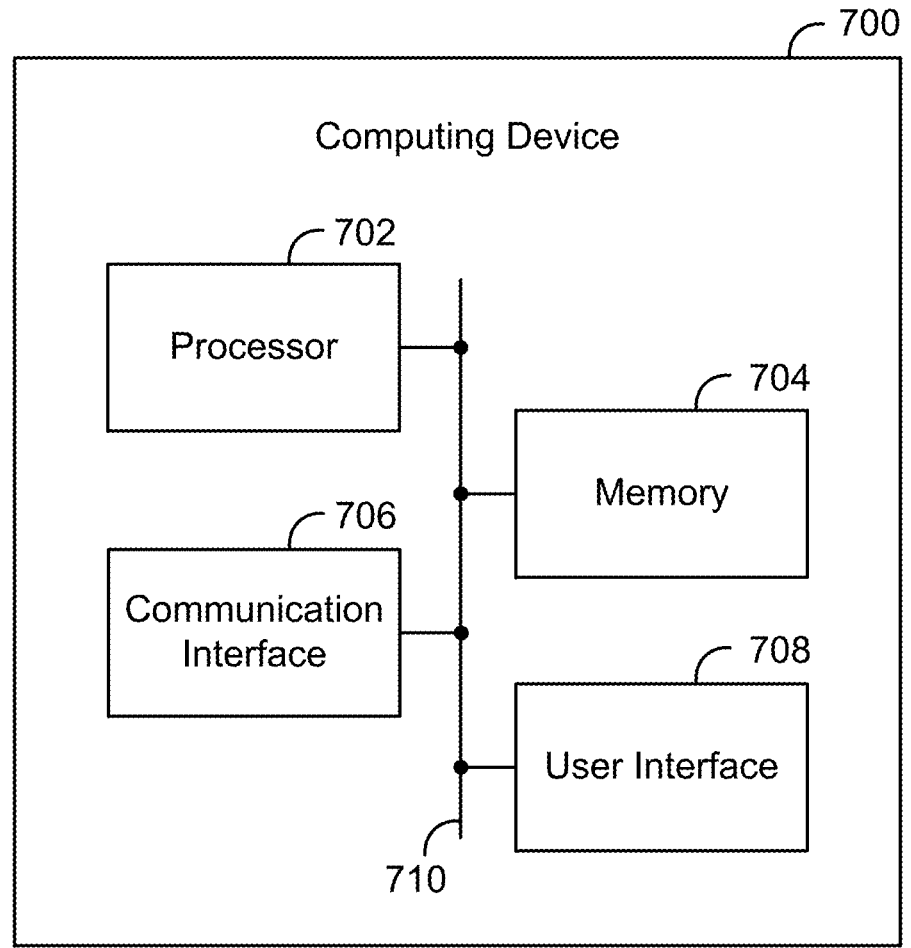
FIG. 7 is a simplified block diagram of an example computing device.

FIG. 7 is a simplified block diagram of an example computing device 700. The computing device 700 can be configured to perform one or more operations, such as the operations described in this disclosure. As shown, the computing device 700 can include various components, such as a processor 702, memory 704, a communication interface 706, and/or a user interface 708. These components can be connected to each other (or to another device, system, or other entity) via a connection mechanism 710.

The processor 702 can include one or more general-purpose processors and/or one or more special-purpose processors.

Memory 704 can include one or more volatile, non-volatile, removable, and/or non-removable storage components, such as magnetic, optical, or flash storage, and/or can be integrated in whole or in part with the processor 702. Further, memory 704 can take the form of a non-transitory computer-readable storage medium, having stored thereon computer-readable program instructions (e.g., compiled or non-compiled program logic and/or machine code) that, upon execution by the processor 702, cause the computing device 700 to perform one or more operations, such as those described in this disclosure. The program instructions can define and/or be part of a discrete software application. In some examples, the computing device 700 can execute the program instructions in response to receiving an input (e.g., via the communication interface 706 and/or the user interface 708), Memory 704 can also store other types of data, such as those types described in this disclosure. In some examples, memory 704 can be implemented using a single physical device, while in other examples, memory 704 can be implemented using two or more physical devices.

The communication interface 706 can include one or more wired interfaces (e.g., an Ethernet interface) or one or more wireless interfaces (e.g., a cellular interface, Wi-Fi interface, or Bluetooth® interface), Such interfaces allow the computing device 700 to connect with and/or communicate with another computing device over a computer network (e.g., a home Wi-Fi network, cloud network, or the Internet) and using one or more communication protocols. Any such connection can be a direct connection or an indirect connection, the latter being a connection that passes through and/or traverses one or more entities, such as a router, switcher, server, or other network device. Likewise, in this disclosure, a transmission of data from one computing device to another can be a direct transmission or an indirect transmission.

The user interface 708 can facilitate interaction between computing device 700 and a user of computing device 700, if applicable. As such, the user interface 708 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, the user interface 708 can include hardware and/or software components that facilitate interaction between the computing device 700 and the user of the computing device 700.

The connection mechanism 710 can be a cable, system bus, computer network connection, or other form of a wired or wireless connection between components of the computing device 700.

One or more of the components of the computing device 700 can be implemented using hardware (e.g., a digital signal processor (DSP), an application-specific integrated circuit (ASIC), a field-programmable gate array (FPGA), another programmable logic device, or discrete gate or transistor logic), software executed by one or more processors, firmware, or any combination thereof. Moreover, any two or more of the components of the computing device 700 can be combined into a single component, and the function described herein for a single component can be subdivided among multiple components.

V. Example Variations

Although the examples and features described above have been described in connection with specific entities and specific operations, in some scenarios, there can be many instances of these entities and many instances of these operations being performed, perhaps contemporaneously or simultaneously, on a large-scale basis.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A computing system comprising a processor and a memory, the computing system configured to perform a set of acts comprising:

obtaining, for a return path data provider in a region, a provider-reported number of subscribers for a television viewing area within the region;

obtaining a sum of weights of panelist households that are located within the television viewing area;

determining a provider distribution by television viewing area using the provider-reported number of subscribers for the television viewing area and the sum of weights of the panelist households that are located within the television viewing area;

obtaining a target distribution of a characteristic for the television viewing area;

determining, using iterative proportional fitting, provider-specific distributions of the characteristic for the television viewing area, wherein the provider distribution by television viewing area and the target distribution of the characteristic for the television viewing area are used as target values for the iterative proportional fitting; and using the provider-specific distributions of the characteristic for the television viewing area as a basis for assigning values of the characteristic to households that are subscribers of the return path data provider and located in the television viewing area.

2. The computing system of claim 1, wherein the set of acts further comprises determining seed values for the iterative proportional fitting based on weights of panelist households that are located within the region and values of the characteristic for the panelist households that are located within the region.

3. The computing system of claim 1, wherein the set of acts further comprises:

obtaining, for the return path data provider, a provider-reported number of subscribers for the region;

obtaining a sum of weights of panelist households that are located within the region;

determining a provider distribution by region using the provider-reported number of subscribers for the region and the sum of weights of the panelist households that are located within the region; and determining seed values for the iterative proportional fitting based on the provider distribution by region.

4. The computing system of claim 3, wherein:

the set of acts further comprises:

identifying panelist households that are located in the region and subscribers of the return path data provider; and estimating a provider-specific distribution of the characteristic for the region based on weights of the identified panelist households and values of the characteristic for the identified panelist households, and the seed values are based further on the provider-specific distribution of the characteristic for the region.

5. The computing system of claim 4, wherein values of the characteristic for the identified panelist households are obtained based on registration of the identified panelist households with a measurement entity.

6. The computing system of claim 1, wherein the set of acts further comprises generating a measurement metric using: a value of the characteristic that is assigned to a household that is a subscriber of the return path data provider and located in the television viewing area, and tuning data for the household.

7. The computing system of claim 6, wherein the set of acts further comprises causing display of the measurement metric on a dashboard.

8. The computing system of claim 1, wherein the set of acts further comprises sending data indicative of the values of the characteristic assigned to the households to another computing system.

9. A method comprising:

obtaining, by a computing system for a return path data provider in a region, a provider-reported number of subscribers for a television viewing area within the region;

obtaining, by the computing system, a sum of weights of panelist households that are located within the television viewing area;

determining, by the computing system, a provider distribution by television viewing area using the provider-reported number of subscribers for the television viewing area and the sum of weights of the panelist households that are located within the television viewing area;

obtaining, by the computing system, a target distribution of a characteristic for the television viewing area;

determining, by the computing system using iterative proportional fitting, provider-specific distributions of the characteristic for the television viewing area, wherein the provider distribution by television viewing area and the target distribution of the characteristic for the television viewing area are used as target values for the iterative proportional fitting; and using the provider-specific distributions of the characteristic for the television viewing area as a basis for assigning values of the characteristic to households that are subscribers of the return path data provider and located in the television viewing area.

10. The method of claim 9, further comprising determining seed values for the iterative proportional fitting based on weights of panelist households that are located within the region and values of the characteristic for the panelist households that are located within the region.

11. The method of claim 9, further comprising:

obtaining, for the return path data provider, a provider-reported number of subscribers for the region;

obtaining a sum of weights of panelist households that are located within the region;

determining a provider distribution by region using the provider-reported number of subscribers for the region and the sum of weights of the panelist households that are located within the region; and determining seed values for the iterative proportional fitting based on the provider distribution by region.

12. The method of claim 11, further comprising:

identifying panelist households that are located in the region and subscribers of the return path data provider; and estimating a provider-specific distribution of the characteristic for the region based on weights of the identified panelist households and values of the characteristic for the identified panelist households, wherein the seed values are based further on the provider-specific distribution of the characteristic for the region.

13. The method of claim 12, wherein values of the characteristic for the identified panelist households are obtained based on registration of the identified panelist households with a measurement entity.

14. The method of claim 9, further comprising generating a measurement metric using: a value of the characteristic that is assigned to a household that is a subscriber of the return path data provider and located in the television viewing area, and tuning data for the household.

15. The method of claim 9, further comprising sending data indicative of the values of the characteristic assigned to the households to another computing system.

16. A non-transitory computer-readable storage medium having stored thereon instructions, that upon execution by a computing system, cause the computing system to perform a set of acts comprising:

obtaining, for a return path data provider in a region, a provider-reported number of subscribers for a television viewing area within the region;

obtaining a sum of weights of panelist households that are located within the television viewing area;

determining a provider distribution by television viewing area using the provider-reported number of subscribers for the television viewing area and the sum of weights of the panelist households that are located within the television viewing area;

obtaining a target distribution of a characteristic for the television viewing area;

determining, using iterative proportional fitting, provider-specific distributions of the characteristic for the television viewing area, wherein the provider distribution by television viewing area and the target distribution of the characteristic for the television viewing area are used as target values for the iterative proportional fitting; and using the provider-specific distributions of the characteristic for the television viewing area as a basis for assigning values of the characteristic to households that are subscribers of the return path data provider and located in the television viewing area.

17. The non-transitory computer-readable storage medium of claim 16, wherein the set of acts further comprises determining seed values for the iterative proportional fitting based on weights of panelist households that are located within the region and values of the characteristic for the panelist households that are located within the region.

18. The non-transitory computer-readable storage medium of claim 16, wherein the set of acts further comprises:

obtaining, for the return path data provider, a provider-reported number of subscribers for the region;

obtaining a sum of weights of panelist households that are located within the region;

determining a provider distribution by region using the provider-reported number of subscribers for the region and the sum of weights of the panelist households that are located within the region; and determining seed values for the iterative proportional fitting based on the provider distribution by region.

19. The non-transitory computer-readable storage medium of claim 18, wherein:

the set of acts further comprises:

identifying panelist households that are located in the region and subscribers of the return path data provider; and estimating a provider-specific distribution of the characteristic for the region based on weights of the identified panelist households and values of the characteristic for the identified panelist households, and the seed values are based further on the provider-specific distribution of the characteristic for the region.

20. The non-transitory computer-readable storage medium of claim 19, wherein values of the characteristic for the identified panelist households are obtained based on registration of the identified panelist households with a measurement entity.

* * * * *